United States Patent
Orhan

(10) Patent No.: US 11,470,113 B1
(45) Date of Patent: Oct. 11, 2022

(54) METHOD TO ELIMINATE DATA THEFT THROUGH A PHISHING WEBSITE

(71) Applicant: Comodo Security Solutions, Inc., Clifton, NJ (US)

(72) Inventor: Fatih Orhan, Cedar Grove, NJ (US)

(*) Notice: Subject to any disclaimer, the term of this patent is extended or adjusted under 35 U.S.C. 154(b) by 164 days.

(21) Appl. No.: 16/277,624

(22) Filed: Feb. 15, 2019

Related U.S. Application Data

(60) Provisional application No. 62/631,410, filed on Feb. 15, 2018.

(51) Int. Cl.
*H04L 9/40* (2022.01)
*G06F 21/62* (2013.01)

(52) U.S. Cl.
CPC ...... *H04L 63/1483* (2013.01); *G06F 21/6263* (2013.01); *H04L 63/1425* (2013.01); *H04L 63/1491* (2013.01)

(58) Field of Classification Search
CPC . H04L 63/14; H04L 63/1408; H04L 63/1416; H04L 63/1425; H04L 63/1433; H04L 63/1483; H04L 63/1491; H04L 63/20; G06F 21/60; G06F 21/62; G06F 21/6245; G06F 21/6263
See application file for complete search history.

(56) References Cited

U.S. PATENT DOCUMENTS

| | | | | |
|---|---|---|---|---|
| 6,449,624 | B1* | 9/2002 | Hammack | G05B 19/0426 |
| 7,698,442 | B1* | 4/2010 | Krishnamurthy | H04L 63/1483 |
| | | | | 709/229 |
| 7,769,820 | B1* | 8/2010 | Spies | H04L 63/08 |
| | | | | 709/218 |
| 7,802,298 | B1* | 9/2010 | Hong | H04L 63/1483 |
| | | | | 726/22 |

(Continued)

FOREIGN PATENT DOCUMENTS

| | | |
|---|---|---|
| CN | 103473509 A | 12/2013 |
| WO | WO2014000696 A1 | 1/2014 |

OTHER PUBLICATIONS

Luyi Xing, Xiaorui Pan, Rui Wang, Kan Yuan and Xiaofeng Wang Upgrading Your Android, Elevating My Malware: Privilege Escalation Through Mobile OS Updating Indiana University Bloomington, published 2014 in 2014 IEEE Symposium on Security and Privacy, pp. 393-408 Electronic ISBN: 978-1-4799-4686-0, DOI: 10.1109/SP.2014.32, Publisher: IEEE, San Jose, CA, USA p. 393, Abstract; p. 394, Contributions: p. 401,402, IV. Finding Pileups.

*Primary Examiner* — Khang Do
(74) *Attorney, Agent, or Firm* — Joseph P. Aiena

(57) ABSTRACT

There is provided a method to eliminate data-theft through a phishing website by creating a layer of control between the user and the website to be visited that prevents submission of sensitive data to malicious servers. When there is a form submit event in a webpage, the data that is input (by the user or automatically) is modified by a data deception layer in a (Continued)

random manner that disguises the authentic content, while preserving the format of the data. Visual cues are provided to indicate that the data deception is enabled and that fake/generated data is being submitted instead of real data. The generated fake data is sent to unknown (potentially malicious) server while the users' actual private data is preserved (never submitted), with the results of the server response visible to the user.

5 Claims, 5 Drawing Sheets

(56) References Cited

U.S. PATENT DOCUMENTS

| | | | |
|---|---|---|---|
| 7,854,001 B1 | 12/2010 | Chen et al. | |
| 8,468,597 B1* | 6/2013 | Warner | H04L 51/12 726/22 |
| 8,984,640 B1* | 3/2015 | Emigh | H04L 63/20 726/25 |
| 9,009,323 B1* | 4/2015 | Theimer | G06F 9/45558 709/226 |
| 9,742,774 B2* | 8/2017 | Wen | H04L 63/1483 |
| 10,404,723 B1* | 9/2019 | Mushtaq | H04L 63/1425 |
| 10,764,313 B1* | 9/2020 | Mushtaq | G06N 20/00 |
| 11,102,244 B1* | 8/2021 | Jakobsson | H04L 51/02 |
| 2006/0018466 A1* | 1/2006 | Adelstein | H04L 63/1425 380/46 |
| 2006/0168066 A1* | 7/2006 | Helsper | G06Q 10/107 709/206 |
| 2007/0192853 A1* | 8/2007 | Shraim | H04L 63/1483 726/22 |
| 2007/0250920 A1* | 10/2007 | Lindsay | G06F 21/31 726/7 |
| 2009/0089561 A1* | 4/2009 | Tomko | G06F 16/957 712/228 |
| 2009/0089859 A1* | 4/2009 | Cook | H04L 51/12 726/3 |
| 2009/0158035 A1* | 6/2009 | Stultz | H04L 9/0844 713/160 |
| 2009/0228780 A1* | 9/2009 | McGeehan | G06F 21/55 726/4 |
| 2009/0300768 A1* | 12/2009 | Krishnamurthy | H04L 63/1483 726/26 |
| 2010/0077483 A1* | 3/2010 | Stolfo | G06F 21/554 726/23 |
| 2011/0088085 A1* | 4/2011 | Novak | H04L 63/1441 709/229 |
| 2011/0126289 A1* | 5/2011 | Yue | G06F 21/554 726/26 |
| 2012/0042364 A1* | 2/2012 | Hebert | G06F 21/46 726/6 |
| 2012/0084866 A1* | 4/2012 | Stolfo | H04L 63/1416 726/25 |
| 2012/0144286 A1* | 6/2012 | Bank | G06F 3/0308 715/230 |
| 2013/0067577 A1 | 3/2013 | Turbin et al. | |
| 2013/0086681 A1* | 4/2013 | Jaroch | G06F 21/566 726/23 |
| 2013/0212658 A1* | 8/2013 | Amaya Calvo | H04L 51/12 726/6 |
| 2013/0263226 A1* | 10/2013 | Sudia | G06F 21/60 726/4 |
| 2013/0283377 A1 | 10/2013 | Das et al. | |
| 2014/0041024 A1* | 2/2014 | Larkins | H04L 63/1483 726/22 |
| 2014/0059649 A1* | 2/2014 | Hu | H04L 63/1483 726/3 |
| 2014/0096242 A1* | 4/2014 | Dong | H04L 63/14 726/22 |
| 2014/0101757 A1 | 4/2014 | Gnesda et al. | |
| 2014/0359411 A1* | 12/2014 | Botta | G06F 40/197 715/205 |
| 2015/0143455 A1 | 5/2015 | Bettini et al. | |
| 2015/0326599 A1* | 11/2015 | Vissamsetty | H04L 63/1433 726/11 |
| 2016/0119365 A1* | 4/2016 | Barel | G06F 16/95 726/12 |
| 2016/0246705 A1* | 8/2016 | Bitar | G06F 11/3684 |
| 2016/0294867 A1* | 10/2016 | Tao | H04L 63/1416 |
| 2016/0337378 A1* | 11/2016 | Wan | G06Q 20/12 |
| 2016/0366171 A1* | 12/2016 | Yagi | H04L 63/1458 |
| 2017/0046712 A1* | 2/2017 | Todasco | G06Q 20/4097 |
| 2017/0052649 A1* | 2/2017 | Alcorn | G06F 3/048 |
| 2017/0078326 A1* | 3/2017 | Child | H04L 63/1483 |
| 2017/0161520 A1* | 6/2017 | Lockhart, III | G06F 21/6263 |
| 2017/0195363 A1* | 7/2017 | Dahan | H04L 63/104 |
| 2017/0215989 A1* | 8/2017 | Gregg, II | A61B 5/4547 |
| 2017/0244755 A1* | 8/2017 | Tsao | G06F 21/44 |
| 2017/0339178 A1* | 11/2017 | Mahaffey | G06F 11/3452 |
| 2017/0364495 A1* | 12/2017 | Srinivasan | G06K 9/00483 |
| 2018/0007066 A1* | 1/2018 | Goutal | H04L 63/1483 |
| 2018/0063170 A1* | 3/2018 | Truve | H04L 63/1425 |
| 2018/0063190 A1* | 3/2018 | Wright | H04L 63/1416 |
| 2018/0285591 A1* | 10/2018 | Thayer | G06F 21/6245 |
| 2018/0343283 A1* | 11/2018 | Goutal | H04L 63/101 |
| 2019/0014141 A1* | 1/2019 | Segal | H04L 63/1433 |
| 2019/0052675 A1* | 2/2019 | Krebs | H04L 63/1416 |
| 2019/0138747 A1* | 5/2019 | Anderson | G06F 21/6254 |
| 2019/0289034 A1* | 9/2019 | Erez | H04L 63/1416 |
| 2020/0162484 A1* | 5/2020 | Solis Agea | H04L 63/1416 |
| 2021/0105302 A1* | 4/2021 | Prakash | G06F 11/3438 |

* cited by examiner

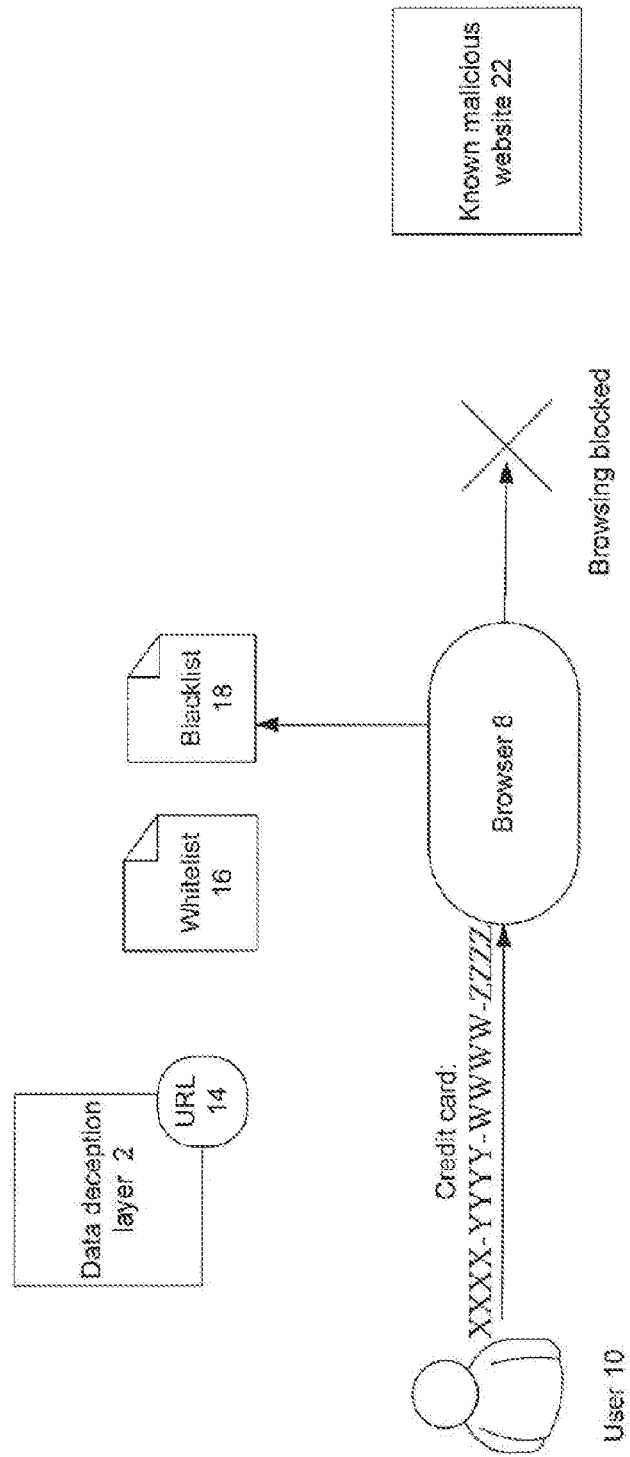

METHOD TO ELIMINATE DATA THEFT THROUGH A PHISHING WEBSITE

CROSS REFERENCE TO RELATED APPLICATIONS

This application claims benefit of and priority to U.S. Provisional Application Ser. No. 62/631,410 filed on Feb. 15, 2018, and incorporated herein by reference in its entirety.

BACKGROUND

Phishing is performed in many different ways and the goal of the act is to steal sensitive information of users. The simple scenario for this malicious act is a phishing website pretends to be a reputable web site and requests sensitive information from the user (email, password, credit card information, social security number, etc). The user provides the requested information, and submits it, without knowing the site is fake. From there, the user's sensitive data is sent to criminals and information is utilized for malicious purposes.

In current methods there are only blacklist and whitelist applications, and either one of them is used at a time. If a blacklist is used, the website URL is checked within blacklist and if found in blacklist, it is blocked, if not found then it is allowed. In this method, the known malicious/phishing websites are blocked successfully, but it misses new/zero-day phishing websites, and until the reactive detection methods identify the website as phishing, all users get hacked and lose their sensitive data.

Another method is the whitelisting of URLs visited by the users. In this method the website URL is checked with a whitelist and if found, then user is allowed to visit the website. If URL is not found in the list, the URL visit is not allowed. Efforts to enlarge the whitelisting require resources, usually human validation, and the speed of whitelisting legitimate sites are not in real-time. This method eliminates the possibility of data being submitted to crime servers, yet it is too restrictive and practically not applicable for all users or every day usage.

Thus there is a need for a more flexible and at the same time effective method to protect users' information from phishing.

SUMMARY OF THE INVENTION

The present invention discloses a method to eliminate data-theft through a phishing website by introducing a layer of control between the user and the website to be visited. This layer guarantees that under any condition, even if users are not aware of the phishing attempt and they provide the sensitive data in the browser, the data will not be stolen and sent to the criminal server. This layer, further called data deception, implements a deception technique and protects the users' sensitive data from being stolen.

According to this method first, the visited webpage is checked with blacklist and whitelists. In case there is a match in either list, proper action is taken (for blacklist it is blocked and whitelist it is allowed without any further action). But when the webpage is not found in any of the lists, and when there is a form submit event in a webpage, the data (i.e username, password, credit card number etc.) being input (by the user or automatically) are modified by the data deception layer in a random manner in order to disguise the authentic content. But at the same time the format is preserved (i.e. if it's a credit card number, the format will be 16 numbers, or SSN would be 3-2-3 numbers). The method to generate the deception data could be chosen as any random data generator as long as the format is preserved. Also the user is visually notified that the data deception is enabled and that fake/generated data is being submitted instead of real data. This way the generated fake data is sent to unknown (potentially malicious) server while the users' actual private data is preserved (never submitted). The user is able to see the result of the server response. In case the webpage is phishing but unbeknownst by the user or system, the next page introduced to the user still presents a successful submission of the form data. The reason is that phishing server does not know anything about the submitted data, and whether it is authentic or fake (auto-generated) doesn't matter, it will accept and proceed as if it is correct. For a legit website, when a fake data is being submitted, the expected behaviour is to see an error message, and the same or similar form asking for the same data to be submitted. i.e if this is a login form, and username or password is wrong, then the website asks again the login and password. The method presented identifies that the next page does not include the expected follow up page when the website is phishing and fake (or random generated) data is being submitted, as the next page will accept the randomly generated data as genuine and proceed to next page. This way, both the data is protected, and also the page is identified as phishing.

To some extent the system can limit the user when a website is not known to whitelist but actually is not a phishing website and legit in all means. Since the data deception layer is sending fake/random data to the legit website, the usability is badly affected. To overcome this, users are enabled with a functionality with an "Allow this website" button after the fake data would be submitted once. That usability will be helpful for the users that want to be protected instead of losing sensitive data.

The present invention includes a method of data deception to eliminate data-theft through a phishing website which comprises introducing and creating a layer of control between the user and the website to be visited by a data deception layer, which modifies data in a form submit event in the website. The data is input by the user or automatically in a random manner in order to disguise the authentic content. Then, the method deploys the data deception layer on an endpoint or on a network and tracks the form submit activity of the browser which is initiated by the user. The method checks the URL when a user visits a website through the browser within the data deception layer and then returns three different values by the data deception layer after the check: URL is in whitelist, URL is in blacklist, URL is in neither of the list or unknown. The data deception layer implements a deception technique and protects the users' sensitive data from being stolen.

The method of the present invention includes eliminating data-theft through a phishing website where the data deception layer defines a URL as whitelisted or as blacklisted. The method includes the steps of allowing the visiting and browsing of the website by the data deception layer if the URL is found in whitelist and the website is known to be safe. The method then blocks the website in the event or situations where the URL is found in a blacklist; and informs the user that the website is malicious/phishing in cases where the URL is found in blacklist.

The method of the present invention eliminates and prevents data-theft through a phishing website where the user submits sensitive information to the website with the URL that is unknown to the data deception layer and not listed in either a whitelist or in a blacklist. The method includes detecting by the data deception layer the website with the unknown URL, then tracking all form submissions by the data deception layer. The method intercepts and alters the values being submitted inside the form whenever the submission detected. The method preserves the format of the data being altered while the data is modified and thus it is useless for the recipient. The method provides for submitting only fake data to the malicious or criminal server. The method notifies the changed fields to the user, before the actual changes are being performed, by various visual indicators that may be presented. The visual indicators include, but are not limited to a red border for each updated field, a red lock icon next to the field. The method thereby makes the user aware that the data deception layer is active and altering the values of submitted fields in order to deceive the server for the protection of the user.

BRIEF DESCRIPTION OF DRAWINGS

FIG. 2B shows depiction of one embodiment of the invention where the data deception layer defines URL as blacklisted.

DETAILED DESCRIPTION

The current invention is a method of data deception to eliminate data-theft through a phishing website by introducing a layer of control between the user and the website to be visited.

Figure 1:
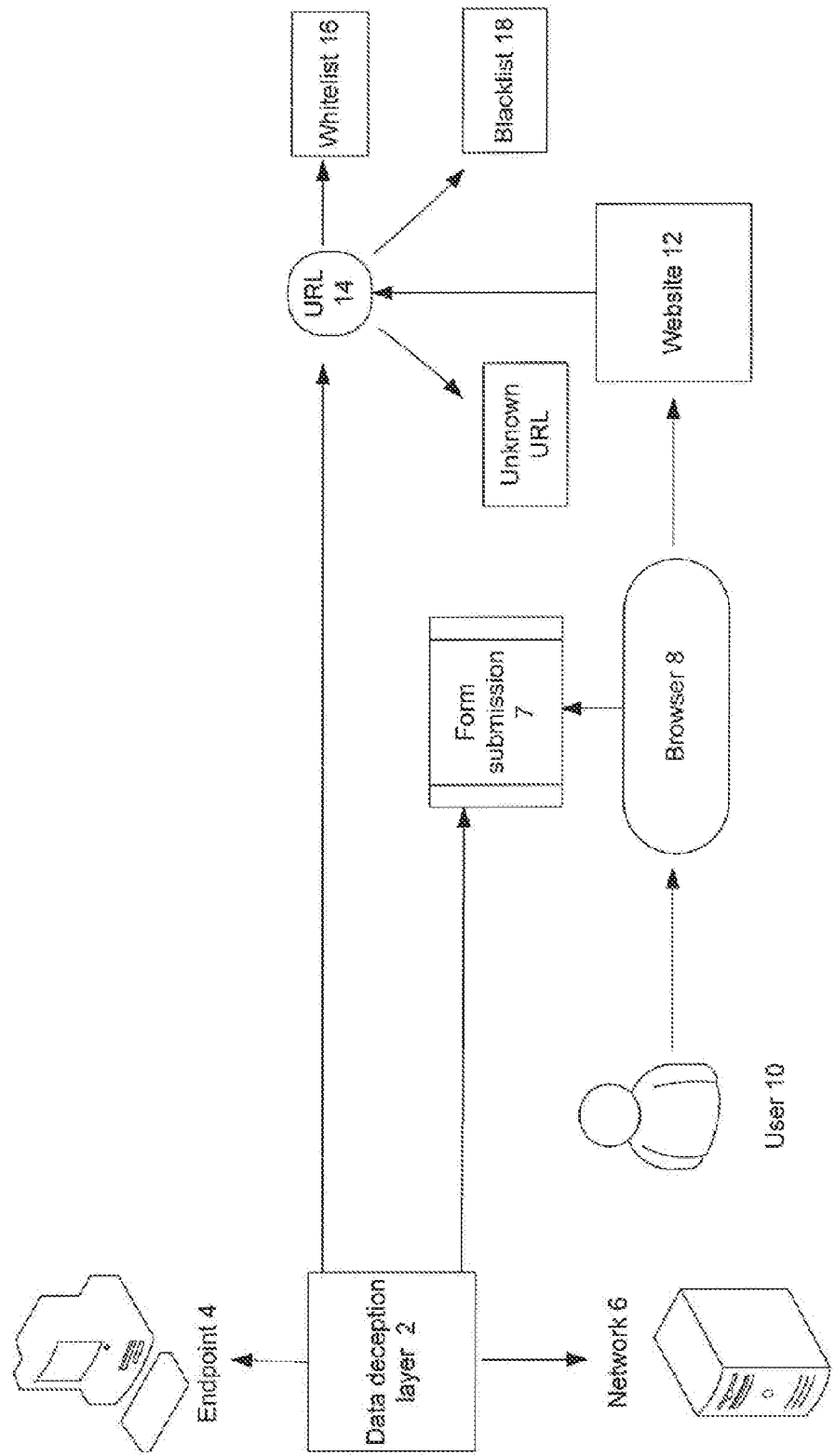
FIG. 1 is a depiction of general scheme of the present invention.

FIG. 1 shows depiction of general scheme of the invention method. There is a system or data deception layer 2 that is deployed on endpoint 4 or on network 6 and tracks form submission activity 7 of the browser 8 that the user 10 is initiating. When user 10 visits a website 12 through the browser 8, the URL 14 visited is checked within the data deception layer 2. This layer 2 may utilize whitelist 16 and blacklist 18 together in order to ease the process and focus only on unknown URLs not found in any of the lists. The whitelist 16 and blacklist 18 are located at either a server or local endpoint, or both. The layer 2 may return three different possible values: URL 14 is in whitelist 16, URL 14 is in blacklist 18 or URL 14 is in neither of the list or unknown.

Figure 2A:
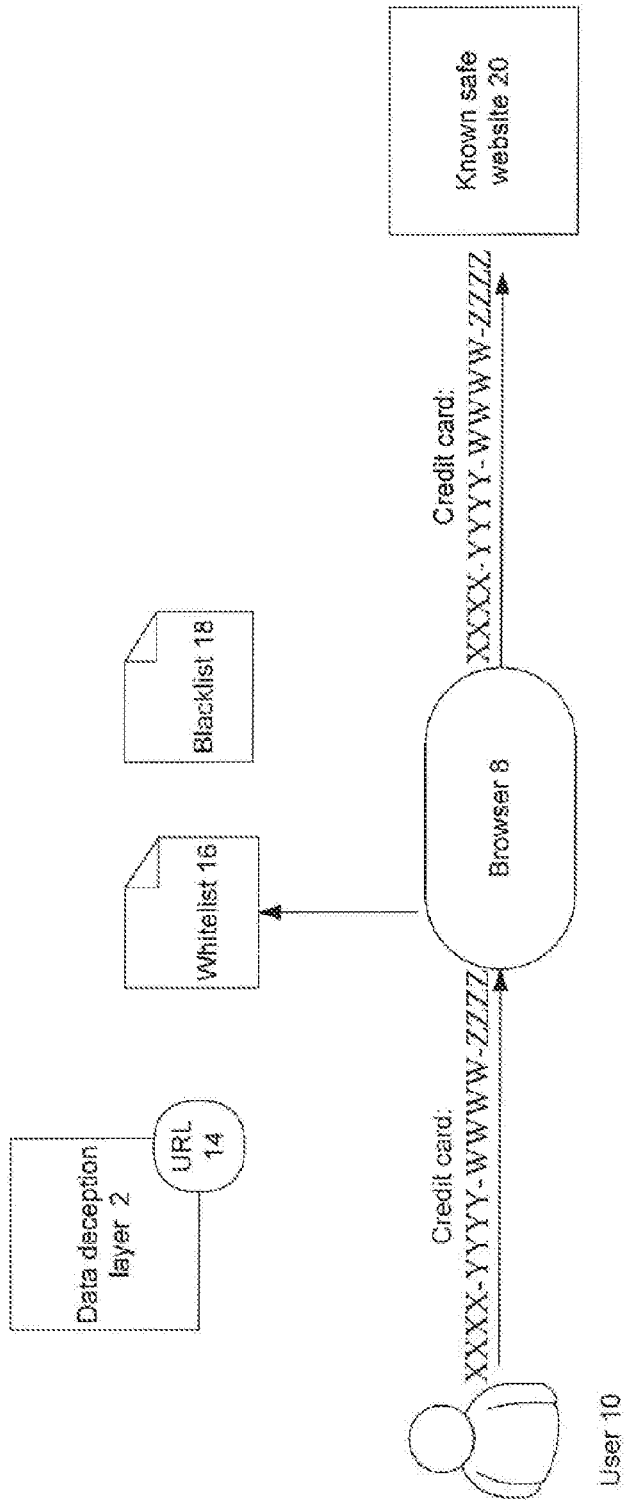
FIG. 2A shows depiction of one embodiment of the invention where the data deception layer defines URL as whitelisted.

FIG. 2A and FIG. 2B show depictions of embodiments of the invention where the data deception layer 2 defines URL 14 as whitelisted 16 or as blacklisted 18. In case the URL 14 is found in whitelist 16, the website 20 is known to be safe. The data deception layer 2 changes nothing during the interaction, it allows the viewing of the website 20 and all interactions. Thus, there is no further involvement of the data deception layer 2 until the user 10 visits another page. In case of the URL 14 is found in blacklist 18, the website 22 is blocked, and user 10 is informed that the website 22 is malicious/phishing.

Figure 3A:
FIG. 3A shows a depiction of another embodiment of the invention where example of phishing website is presented.
Figure 3B:
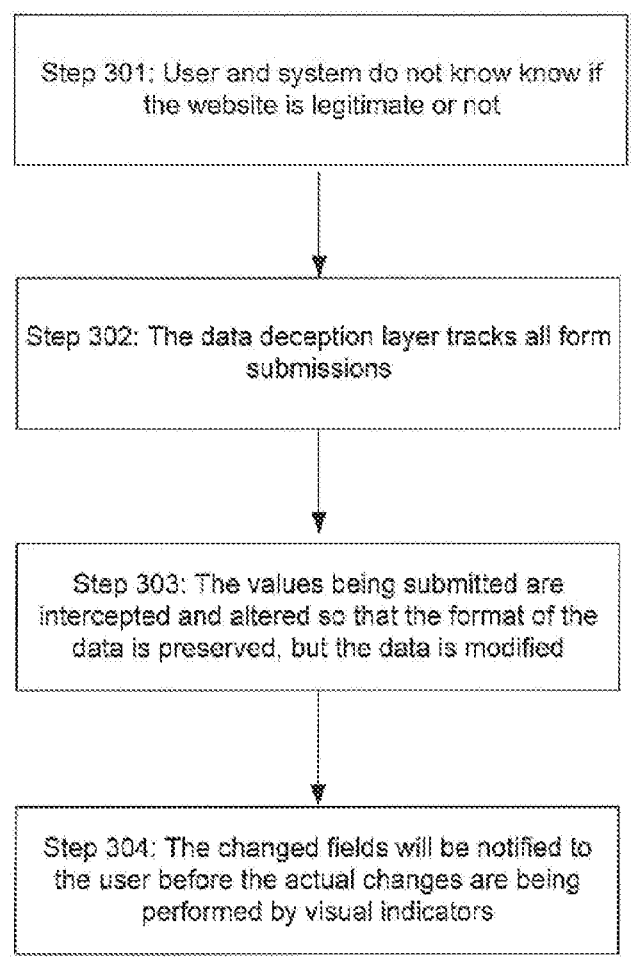
FIG. 3B shows flowchart of other embodiment of the invention where the user submits sensitive information to the website with the URL that is unknown to the data deception layer.

FIG. 3A and FIG. 3B show depictions and flowchart of other embodiments of the invention where the user submits sensitive information to the website with the URL 14 that is unknown to the data deception layer 2 and not listed in either whitelist 16 or in blacklist 18. In this case the data deception layer 2 plays a critical role and thus the user 10 is protected towards any sensitive data stealing. In step 301 the user 10 and the system 2 do not know if the website 16 is legitimate or not. Thus the data deception layer 2 needs to protect the data being submitted, and it should make sure the sensitive data is not submitted to criminal or malicious server. An example of phishing website is presented on FIG. 3A, which is usually using a well-known web site name to deceive users. To protect user 10, step 302, the data deception layer 2 tracks all form submissions 7, and whenever the submission 7 is detected, step 303, the values being submitted inside the form are intercepted and altered so that the deception occurs where fake data is being submitted to the crime server. Here the format of the data being altered is preserved, but the data is modified and thus it is useless for the recipient.

Examples of data modifications are:

Email address input might be name.name@example.com, but after modification would be kdjei.qad@pwader.com;

Password might be 'SecurePassword1234' but after modification would be 'iakd93!.a2fBW2xks@1s';

Credit card might be 'XXXX-YYYY-WWWW-ZZZZ' but after modification would be 'AAAA-BBBB-CCCC-DDDD';

Social security number (SSN) might be: YYY-ZZ-XXXX, but after modification would be 'CCC-BB-AAAA'.

Besides changing the data and preserving the format, step 304, the changed fields are notified to the user 10 before the actual changes are being performed by visual indicators (such as a red border for each updated field, and/or a red lock icon next to the field). This way the user 10 knows that data deception layer 2 is active and altering to values of submitted fields in order to deceive the server for the protection of the user 10.

The invention is not restricted to the details of the foregoing embodiments. The invention extend to any novel one, or any novel combination, of the features disclosed in this specification (including any accompanying claims, abstract and drawings), or to any novel one, or any novel combination, of the steps of any method or process so disclosed.

What is claimed is:

1. A method of data deception to eliminate data-theft through a phishing website comprising:

introducing a layer of control between a user and a website to be visited by a data deception layer, which modifies data in a form submit event in the website, being input by the user or automatically in a random manner in order to disguise authentic content;

deploying the data deception layer on endpoint or on network;

tracking form submit activity of a browser which is initiated by the user;

checking a uniform resource locator (URL) when user visits the website through the browser within the data deception layer;

returning one of three different values by the data deception layer after check: the URL is in whitelist, the URL is in blacklist, the URL is in neither of the list or unknown;

implementing, by the data deception layer, a deception technique that protects sensitive data of the user from being stolen, said sensitive data includes a credit card number;

submitting, by the user, sensitive information to the website with the URL that is unknown to the data deception layer and not listed in either whitelist or in blacklist comprising:

detecting by the data deception layer the website with the unknown URL;

tracking all form submissions by the data deception layer;

intercepting and altering values being submitted inside the form whenever the submission is detected;

preserving the format of the data being altered while the data is modified and thus it is useless for a recipient, said data being altered includes said credit card number;

submitting fake data to a crime server;

notifying changed fields to the user before actual changes are being performed by various visual indicators that are presented as a red border for each updated field, and a red lock icon next to the field where the user is aware that data deception layer is active and altering values of submitted fields for the protection of the user.

2. The method according to claim 1 to eliminate data-theft through a phishing website where the data deception layer defines the URL as whitelisted or as blacklisted comprising:

allowing visiting and browsing of the website by the data deception layer if the URL is found in whitelist and the website is known to be safe;

blocking the website in case the URL is found in blacklist; and informing the user that the website is malicious/phishing in case the URL is found in blacklist.

3. The method according to claim 1 wherein said data being altered includes an email address.

4. The method according to claim 1 wherein said data being altered includes a password.

5. The method according to claim 1 wherein said data being altered includes a social security number.

* * * * *